United States Patent
Yamamoto et al.

(10) Patent No.: US 8,275,965 B2
(45) Date of Patent: Sep. 25, 2012

(54) CREATING SUBSTITUTE AREA CAPACITY IN A STORAGE APPARATUS USING FLASH MEMORY

(75) Inventors: Masayuki Yamamoto, Sagamihara (JP); Akira Yamamoto, Sagamihara (JP); Akira Fujibayashi, Sagamihara (JP); Jun Kitahara, Yokohama (JP); Yoshiki Kano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 913 days.

(21) Appl. No.: 12/248,519

(22) Filed: Oct. 9, 2008

(65) Prior Publication Data

US 2009/0287878 A1    Nov. 19, 2009

(30) Foreign Application Priority Data

May 14, 2008 (JP) ................................. 2008-126608
Aug. 22, 2008 (JP) ................................. 2008-213464

(51) Int. Cl.
*G06F 12/16* (2006.01)

(52) U.S. Cl. ................. 711/170; 711/103; 711/E12.008

(58) Field of Classification Search .................. 711/103, 711/170, 172, 173, E12.008
See application file for complete search history.

(56) References Cited

U.S. PATENT DOCUMENTS

| 6,529,416 B2 | 3/2003 | Bruce et al. |
| 2005/0166088 A1* | 7/2005 | Yamagami et al. ................ 714/8 |
| 2006/0168369 A1 | 7/2006 | Ohno et al. |
| 2007/0271434 A1* | 11/2007 | Kawamura et al. ............ 711/165 |
| 2008/0065815 A1* | 3/2008 | Nasu et al. ..................... 711/103 |
| 2008/0098193 A1* | 4/2008 | Im et al. ......................... 711/170 |
| 2009/0172248 A1* | 7/2009 | You ................................ 711/103 |

FOREIGN PATENT DOCUMENTS

JP    2004-005370    1/2004

* cited by examiner

*Primary Examiner* — Hal Schnee
(74) *Attorney, Agent, or Firm* — Brundidge & Stanger, P.C.

(57) ABSTRACT

For a storage apparatus in which flash memory disks and hard disks coexist, high-density mounting of flash memory modules is achieved. A storage apparatus in accordance with the present invention includes flash memories and a storage controller. A second storage apparatus including magnetic disks is connected to the storage apparatus. For creation of a logical volume, the storage controller can form a storage area using a flash memory or a magnetic disk. When an input/output request is issued from a host computer, if a storage area is formed with a flash memory, the storage controller directly accesses the flash memory to handle the input/output request. When the storage apparatus defines a storage area formed with a flash memory, the storage apparatus defines the storage area by adding up the capacity of a storage area to be provided for the host computer and a substitute area capacity determined in consideration of restrictions imposed on the number of times of deletion of the flash memory.

8 Claims, 18 Drawing Sheets

```
                                                        71000
┌──────────────────────────────────────────────────────────┐
│ INTERNAL DEVICE CREATION SCREEN IMAGE                    │
│                                                          │
│                                              70010       │
│ HOST RECOGNIZABLE CAPACITY:   [ 768 GB ]                 │
│                                                          │
│                                              70020       │
│ SUBSTITUTE AREA CAPACITY:     [ 256 GB ]                 │
│                                                          │
│                                              70030       │
│ RAID CONFIGURATION:           [ RAID5 (3D+1P) ]          │
│                                                          │
│                                              70040       │
│ USAGE OF LOGICAL DEVICE:      [ DATABASE ]               │
│                                                          │
│                                              70060       │
│ USEFUL LIFE SPAN:             [ THREE YEARS ]            │
│                                                          │
│                                              70070       │
│ MATE LOGICAL DEVICE:          [ L02 ]                    │
│                                                          │
│                     70050  [ INTERNAL DEVICE CREATION ]  │
└──────────────────────────────────────────────────────────┘
```

FIG. 3

| LDEV ID | HOST RECOGNIZABLE CAPACITY | ASSOCIATED DEV ID | STATE | PORT NUMBER/ TARGET ID/ LUN |
|---|---|---|---|---|
| L01 | 576 GB | IN01 | Allocated | P11/2/0 |
| L02 | 768 GB | EX01 | Allocated | P11/2/1 |
| L03 | 360 GB | IN02 | Unallocated | N/A |
| L04 | 768 GB | EX02 | Unallocated | N/A |

32100 LDEV TBL

Column headers: 32110, 32120, 32130, 32140, 32150

FIG. 4

| INDEV ID | BASIC CAPACITY | SUBSTITUTE AREA CAPACITY | ASSOCIATED LDEV ID | RAID CONFIGURATION |
|---|---|---|---|---|
| IN01 | 768 GB | 256 GB | L01 | RAID5(3D+1P) |
| IN02 | 480 GB | 32 GB | L02 | RAID5(3D+1P) |

Column headers: 32210, 32220, 32230, 32240, 32250

| STRIPE SIZE | ASSOCIATED FPK | ASSOCIATED FM NUMBER | ADDRESS SPACE ASSOCIATION LIST (INDEV ADDRESS, FM MEMORY BLOCK) |
|---|---|---|---|
| 256 KB | FPK1-4 | 1 | (0 to 768 KB, FM1-#1), (768 KB to 1536 KB, FM1-#850), ... , (768 GB - 768 KB to 768 GB, FM1-#768) |
| 256 KB | FPK1-4 | 2 | .... |

Column headers: 32260, 32270, 32280, 32290

32200 INDEV TBL

FIG. 5

EXDEV TBL 32300

| EXDEV ID (32310) | HOST RECOGNIZABLE CAPACITY (32320) | ASSOCIATED LDEV ID (32330) | INITIATOR PORT ID (32340) |
|---|---|---|---|
| EX01 | 768 GB | L02 | P12 |
| EX02 | 768 GB | L04 | P12 |

STORAGE IDENTIFICATION INFORMATION

| DEVICE ID (32350) | LDEV ID (32360) | PORT NUMBER/TAGET ID/LUN (32370) |
|---|---|---|
| ST2 | L11 | P21/3/0 |
| ST2 | L12 | P21/3/1 |

FIG. 6

CM TBL 32400

| Block ID (32410) | STATE (32420) | ASSOCIATED LDEV ID (32430) | LDEV ADDRESS (32440) |
|---|---|---|---|
| B0001 | Clean | L01 | 0 to 768 KB |
| B0002 | Dirty | L01 | 768 KB to 1536 KB |
| B0003 | Clean | L02 | 0 to 512 KB |
| B0004 | Not Used | N/A | N/A |
| .... | .... | .... | .... |
| B0512 | Not Used | N/A | N/A |

| CACHE BLOCK LENGTH = 1024 KB | 32450 |
| CACHE CAPACITY = 512 GB | 32460 |

FIG. 7

| FPK ID (32510) | FM ID (32520) | CAPACITY (32530) | ADDRESS SPACE (32540) |
|---|---|---|---|
| FPK1 | FM1-1 | 256 GB | 0-256 GB |
| | FM1-2 | 256 GB | 0-128 GB |
| | | | 128 GB-256 GB |
| | ...... | ...... | ...... |
| FPK2 | FM2-1 | 256 GB | 0-256 GB |
| | ...... | ...... | ...... |
| FPK3 | FM3-1 | 256 GB | 0-256 GB |
| | ...... | ...... | ...... |
| FPK4 | FM4-1 | 256 GB | 0-256 GB |
| | ...... | ...... | ...... |

| STATE (32550) | ALLOCATED INDEV ID (32560) | REWRITING FREQUENCY (32570) |
|---|---|---|
| Used | IN01 | 250 |
| Used | IN02 | 128 |
| Not Used | N/A | N/A |
| ...... | ...... | ...... |
| Used | IN01 | 140 |
| ...... | ...... | ...... |
| Used | IN01 | 580 |
| ...... | ...... | ...... |
| Used | IN01 | 280 |
| ...... | ...... | ...... |

32500 FPK TBL

LOGICAL DEVICE LIST DISPLAY SCREEN IMAGE

| LDEV ID | HOST RECOGNIZABLE CAPACITY | ASSOCIATED DEV ID | STATE | PORT NUMBER/ TARGET ID/ LUN |
|---|---|---|---|---|
| L01 | 576 GB | IN01 | Allocated | P11/2/0 |
| L02 | 768 GB | EX01 | Allocated | P11/2/1 |
| L03 | 360 GB | IN02 | Unallocated | N/A |
| L04 | 768 GB | EX02 | Unallocated | N/A |

| BASIC CAPACITY | SUBSTITUTE AREA CAPACITY | RAID CONFIGURATION | WARNING AGAINST DEFECTIVE |
|---|---|---|---|
| 768 GB | 256 GB | RAID5(3D+1P) | X |
| N/A | N/A | N/A | N/A |
| 480 GB | 32 GB | RAID5(3D+1P) | |
| N/A | N/A | N/A | N/A |

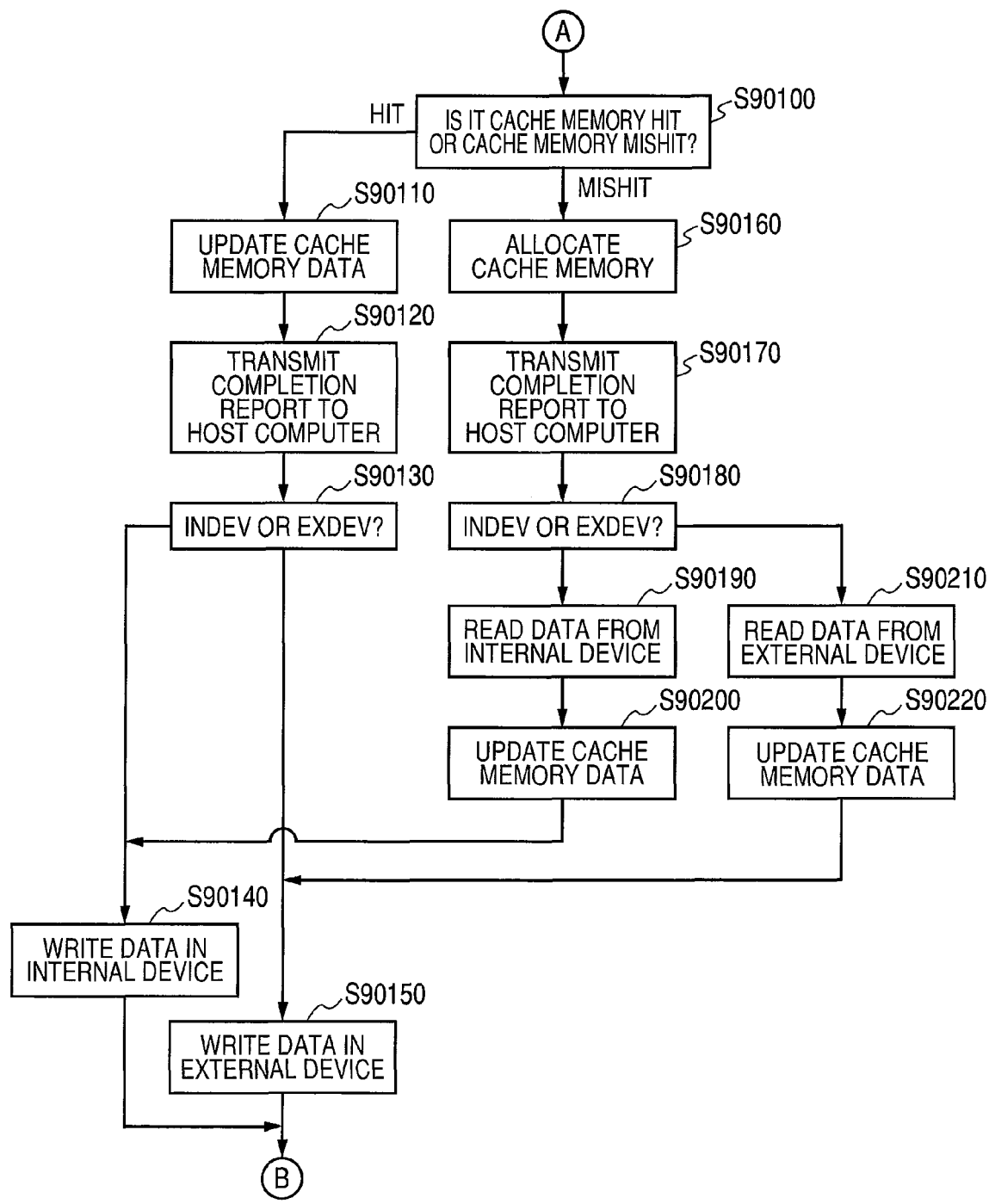

FIG. 12

| USAGE ID 32310 | USAGE 32320 | SUBSTITUTE AREA CAPACITY PER YEAR 32330 |
|---|---|---|
| USAGE01 | DATABASE | 50 GB |
| USAGE02 | MAIL | 20 GB |

32800 USAGE TBL

FIG. 15

| LDEV ID (32110) | HOST RECOGNIZABLE CAPACITY (32120) | ASSOCIATED DEV ID (32130) | STATE (32140) |
|---|---|---|---|
| L01 | 576 GB | IN01 | Allocated |
| L02 | 768 GB | EX01 | Allocated |
| L03 | 360 GB | IN02 | Unallocated |
| L04 | 768 GB | EX02 | Unallocated |

| PORT NUMBER/ TARGET ID/ LUN (32150) | WRITING ACCESS FREQUENCY (32160) |
|---|---|
| P11/2/0 | 80 IOPS |
| P11/2/1 | 100 IOPS |
| N/A | 90 IOPS |
| N/A | 110 IOPS |

36000 LDEV TBL

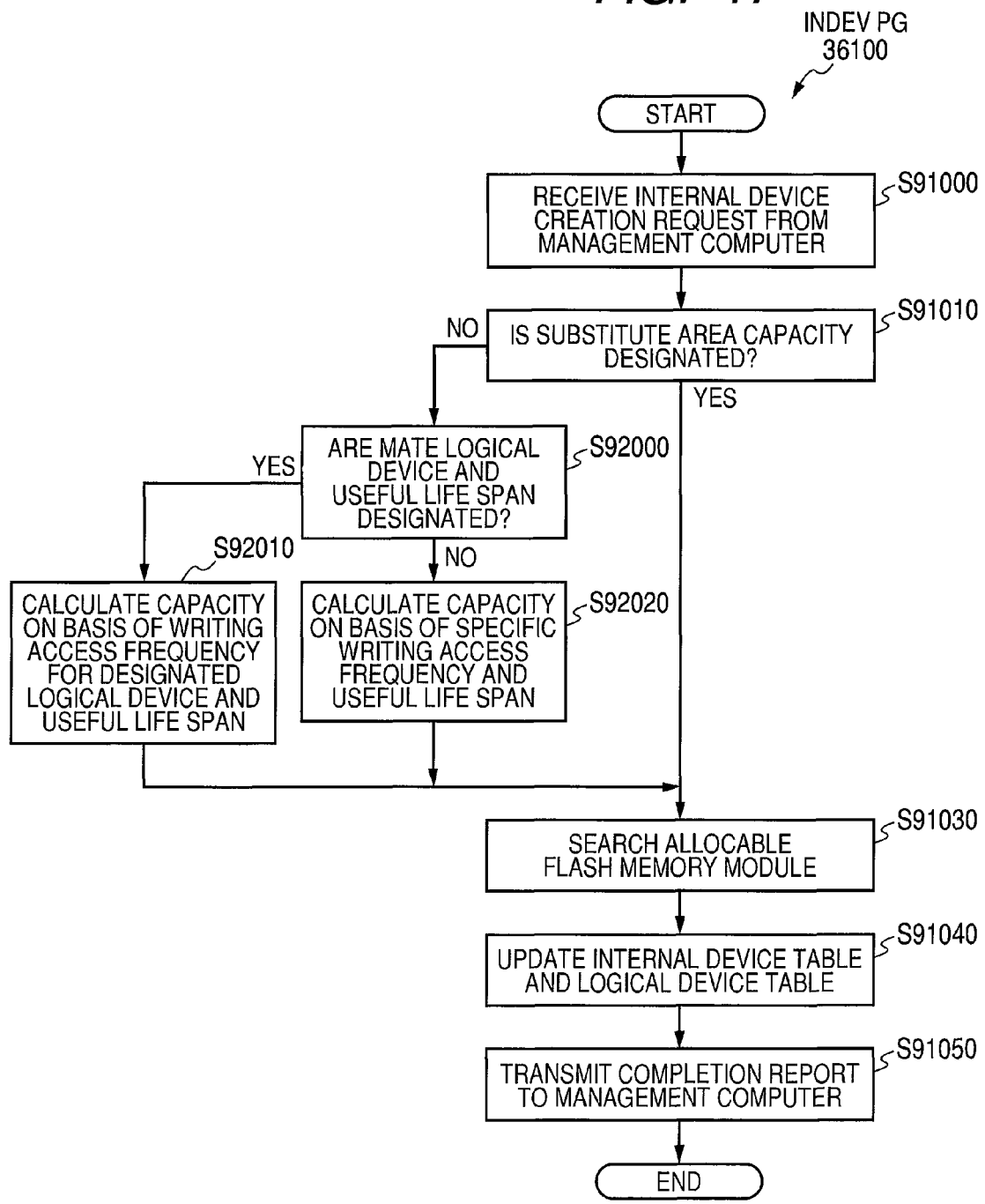

FIG. 18

$$\begin{aligned}
\text{SUBSTITUTE AREA CAPACITY} \\ \text{(UNIT: GIGABYTES)}
\end{aligned} = \left\{ \begin{aligned}
&\begin{aligned}\text{FLASH MEMORY BLOCK} \\ \text{REWRITING FREQUENCY} \\ \text{(UNIT: NUMBER OF} \\ \text{TIMES PER SEC)}\end{aligned} \times \begin{aligned}\text{REWRITTEN BLOCK LENGTH} \\ \text{(UNIT: KILOBYTES)}\end{aligned} \times \begin{aligned}\text{USEFUL LIFE SPAN} \\ \text{(UNIT: SEC)}\end{aligned} \\
&\div \begin{aligned}\text{UPPER LIMIT OF NUMBER} \\ \text{OF TIMES OF REWRITING}\end{aligned} \times 10^{-6}
\end{aligned} \right.$$

$$\begin{aligned}\text{FLASH MEMORY BLOCK} \\ \text{REWRITING FREQUENCY} \\ \text{(UNIT: NUMBER OF} \\ \text{TIMES PER SEC)}\end{aligned} = \begin{aligned}\text{WRITING ACCESS FREQUENCY} \\ \text{FOR MATE LOGICAL DEVICE} \\ \text{(UNIT: IOPS)}\end{aligned} \div \begin{aligned}\text{COMPREHENSIVE} \\ \text{NUMBER OF REWRITINGS} \\ \text{(UNIT: 1/10)}\end{aligned}$$

CREATING SUBSTITUTE AREA CAPACITY IN A STORAGE APPARATUS USING FLASH MEMORY

CROSS REFERENCES TO RELATED APPLICATIONS

This application relates to and claims priority from Japanese Patent Application No. 2008-126608, field on May 14, 2008, the entire disclosure of which is incorporated herein by reference.

BACKGROUND OF THE INVENTION

1. Field of the Invention

The present invention relates to a storage apparatus employed in a computer system. More particularly, the present invention is concerned with a storage apparatus using a nonvolatile semiconductor memory such as a flash memory.

2. Description of the Related Art

Generally, storage apparatuses include a randomly accessible nonvolatile storage medium. The randomly accessible nonvolatile storage medium is for example, a magnetic disk (which may be called a hard disk), an optical disk, or the like. As described in, for example, a patent document 1, numerous hard disks are integrated.

In recent years, a storage apparatus using as a storage medium a nonvolatile semiconductor memory such as a flash memory in place of the conventionally employed hard disk has attracted attention. The flash memory has the merits that it can operate at a higher speed than the hard disk can and that the power consumption is limited. A patent document 2 has disclosed a technology for substituting a flash memory disk, which includes multiple flash memories and can be accessed by an accessing means for the conventional hard disk such as an accessing means conformable to the small computer system interface (SCSI) standard, for the hard disk of a storage apparatus.

Incidentally, the patent document 1 refers to JP-A-2004-5370 and the patent document 2 refers to U.S. Pat. No. 6,529,416.

SUMMARY OF THE INVENTION

In a conceivable mode for utilizing the features of the storage media that are the flash memory and hard disk: when a logical device that provides a memory area for a host computer is requested to offer high random read accessibility for a large amount of data in, for example, a data warehouse, a logical device formed with a flash memory is provided; and when a cost of data retention such as archival of long-term data has to be suppressed, a logical device formed with a hard disk is provided. Thus, preferably, one storage apparatus can provide two logical devices formed with different storage media.

In a mode for realizing the storage apparatus, the flash memory disk described in the patent document 2 is incorporated in the storage apparatus described in the patent document 1 so that the flash memory disk and hard disk will coexist. Thus, the nonvolatile semiconductor memory such as the flash memory can be used as the storage medium without the necessity of changing the SCSI accessing means to another. However, the flash memory that can be incorporated in the storage apparatus is restricted by the form for the hard disk to which the flash memory disk conforms. This poses a problem in that high-density mounting of flash memories is harder to achieve than it is in the storage apparatus to which the flash memory is connected as it is. Moreover, since the performance of the flash memory disk depends on the peak performance of the accessing means for the magnetic disk, even if the accessibility of the flash memory improves, the accessibility may not be able to be fully exerted.

In order to solve the foregoing problems, a storage apparatus that includes an accessing means to be used to directly input or output data from or to a flash memory in place of the conventional accessing means for the hard disk, and also includes the accessing means for the hard disk has to be realized.

The present invention addresses the foregoing problems.

A storage apparatus in accordance with the present invention at least includes flash memories in which data is stored and a storage controller that controls the storage apparatus. A host computer that issues an input/output request, a management computer that manages a storage system, and a second storage apparatus including a magnetic disk are connected to the storage apparatus. The flash memories are mounted in a flash memory package (substrate), and can be added to the storage apparatus in units of a flash memory module or a flash memory package. When a logical volume that is a storage area in which data such as an operating system (OS) which runs in the host computer is stored has to be created, the storage controller may form the storage area using the flash memory in the flash memory package incorporated in the storage apparatus. According to the technology described in the patent document 1, the storage area may be realized using a storage area formed with the magnetic disk incorporated in the second storage apparatus. When an input/output request is issued from the host computer, if the storage area is formed using the flash memory incorporated in the storage apparatus, the storage controller directly accesses the flash memory so as to handle the input/output request. If the storage area is formed using the magnetic disk incorporated in the second storage apparatus, an accessing means for a magnetic disk such as an SCSI command is used to handle the input/output request. When the storage area formed with the flash memory is defined in the storage apparatus, the storage capacity of the storage area to be provided for the host computer and a substitute area capacity determined in consideration of restrictions imposed on the number of times of deletion of the flash memory are summed up. At this time, usage signifying to what application the storage area is allocated may be designated in order to release a storage manager from inputting the substitute area capacity. When the storage area formed with the flash memory is defined, the substitute area capacity may be calculated based on the writing access frequency for the storage area that is formed with the hard disk drive and has a relationship of a copy mate with the storage area.

According to the present invention, since flash memories are incorporated in a storage apparatus while being mounted in a flash memory package, high-density mounting of flash memories can be achieved.

BRIEF DESCRIPTION OF THE DRAWINGS

FIG. 3 shows an example of a logical device table installed in the storage apparatus ST1 of the embodiment 1 in accordance with the present invention;

FIG. 4 shows an example of an internal device table installed in a storage apparatus ST1 of the embodiment 1 or 2 in accordance with the present invention;

FIG. 5 shows an example of an external device table installed in the storage apparatus ST1 of the embodiment 1 or 2 in accordance with the present invention;

FIG. 6 shows an example of a cache allocation table installed in the storage apparatus ST1 of the embodiment 1 or 2 in accordance with the present invention;

FIG. 7 shows an example of a flash memory package table installed in the storage apparatus ST1 of the embodiment 1 or 2 in accordance with the present invention;

FIG. 10 shows an example of a logical device list display screen image to be displayed by the management computer while the device management program is being run by the storage apparatus ST1 of the embodiment 1 or 2 in accordance with the present invention;

FIGS. 11A-11B are flowcharts describing the contents of processing to be performed by an input/output control program that is by the storage apparatus ST1 of the embodiment 1 or 2 in accordance with the present invention;

FIG. 12 shows an example of a usage-based substitute area capacity table installed in the storage apparatus ST1 of the embodiment 1 or 2 in accordance with the present invention;

FIG. 15 shows an example of a logical device table installed in the storage apparatus ST1 of the embodiment 2 in accordance with the present invention;

FIG. 17 is a flowchart showing the contents of processing to be performed by the internal device configuration program that is run by the storage apparatus ST1 of the embodiment 2 in accordance with the present invention;

FIG. 18 shows an example of expressions to be employed in the internal device configuration program that is run by the storage apparatus ST1 of the embodiment 2 in accordance with the present invention.

DESCRIPTION OF THE PREFERRED EMBODIMENTS

Figure 1:
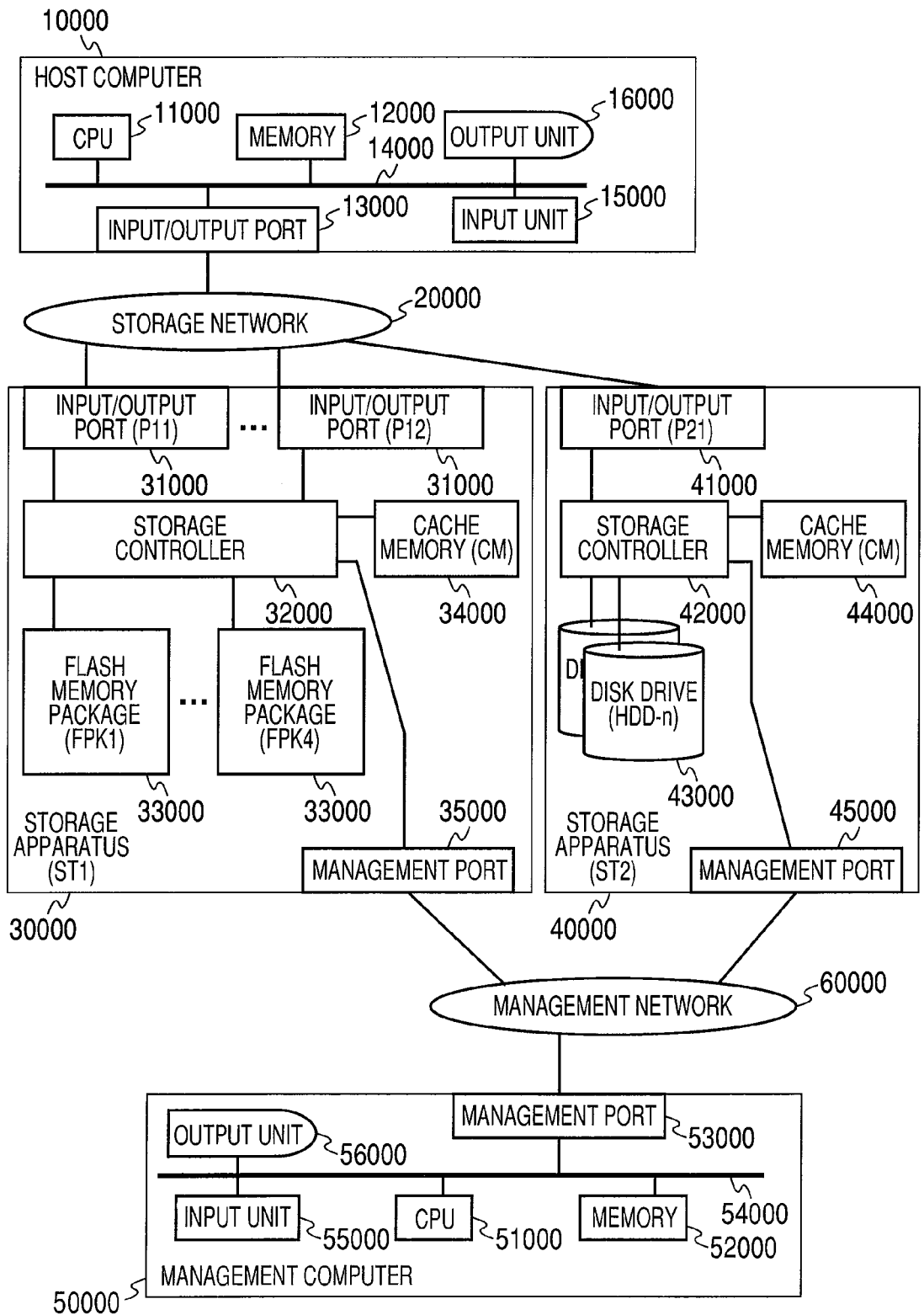
FIG. 1 shows an example of the configuration of a computer system in which the present invention is employed.

Referring to the drawings, embodiments of the present invention will be described below. Noted is that the present invention will not be limited to the embodiments.

Embodiment 1

In the present embodiment, a storage apparatus in which a flash memory is incorporated while being mounted in a flash memory package and which is connected to a conventional storage apparatus having a magnetic disk incorporated therein can handle an input/output request through both direct access to the flash memory and access to the conventional magnetic disk.

(1-1) Configuration of a Computer System in which the Embodiment 1 is Employed

Figure 2:
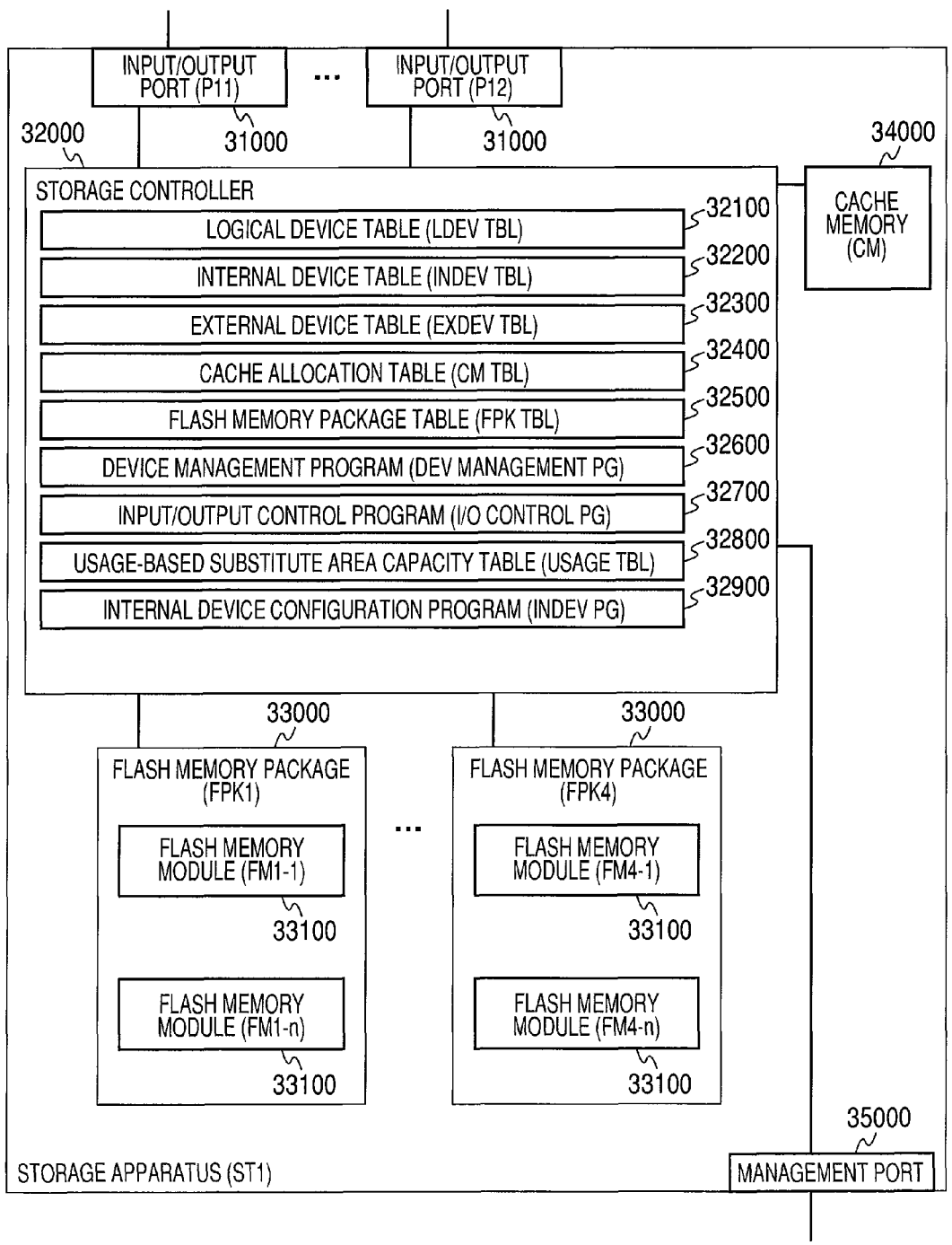
FIG. 2 shows an example of the detailed configuration of a storage apparatus ST1 of an embodiment 1 in accordance with the present invention.

The configuration of a computer system in which the embodiment 1 is employed will be described below. FIG. 1 and FIG. 2 show the configuration of the computer system and the configuration of an apparatus included in the computer system. FIG. 3 to FIG. 7 show pieces of management information to be installed in apparatus.

FIG. 1 shows the configuration of the computer system. One or more host computers 10000, a storage apparatus 30000 in which a flash memory to be described later is incorporated, and one or more storage apparatuses 40000 in which a hard disk to be described later is incorporated are interconnected over a storage network 20000. Moreover, the storage apparatuses 30000 and 40000 are connected to a management computer 50000 over a management network 60000.

The detailed configuration of the host computer 10000 will be described below. The host computer 10000 includes a central processing unit (CPU) 11000, a memory 12000, one or more input/output ports 13000 through which the host computer is connected to the storage network 20000, an output unit 16000 that outputs the results of processing such as a display device, and an input unit 15000 such as a keyboard and a mouse. These components are interconnected over an internal bus 14000. An operating system (not shown), and an application (not shown) that performs processing accompanied by data access to be gained to the storage apparatus reside in the memory 12000. These programs are loaded from a storage medium (not shown) such as a hard disk. The CPU 11000 shall reference the programs.

The storage apparatus 30000 includes an input/output port 31000, a storage controller 32000, flash memory packages 33000 in which a flash memory is mounted, a cache memory 34000, and a management port 35000 through which the storage apparatus is connected to the management network 60000. An example of the detailed configuration will be described later.

The storage apparatus 40000 includes an input/output port 41000, a storage controller 42000, hard disks 43000, a cache memory 44000, and a management port 45000. For brevity's sake, the storage apparatus 40000 employed in the present invention shall be an apparatus that provides a storage area in the hard disk 43000 of the storage apparatus 40000 as a storage area of the storage apparatus 30000 according to the technology described in the patent document 1. Since the storage apparatus 40000 performs the same input/output processing as the conventional storage apparatus does, an iterative description will be omitted.

The detailed configuration of the management computer 50000 will be described. The management computer 50000 includes a CPU 51000, a memory 52000, a management port 53000, an output unit 56000 that outputs the results of processing such as a display device, and an input unit 55000 such as a keyboard and a mouse. These components are interconnected over an internal bus 54000. The management computer 50000 loads a program into the memory 52000 thereof through communication with a storage medium (not shown) such as a hard disk or the storage apparatus 30000 or 40000, and runs the program so as to execute operational management for the storage apparatus 30000 or 40000. Moreover, the operating system (OS) is loaded from the storage medium into the memory 52000, though it is not shown. The CPU 51000 runs the programs.

The storage network 20000 linking the host computers and storage apparatuses and interconnecting the storage apparatuses may be realized with a switch or direct connections among the apparatuses.

For convenience' sake, in the embodiment 1, the host computer shall be connected to the storage apparatuses ST1 and ST2 over the storage network. Moreover, the storage network 20000 shall be a network based on the Fibre Channel (FC) protocol, and the management network 60000 shall be a network based on the IP protocol.

FIG. 2 shows an example of the detailed configuration of the storage apparatus 30000. The storage apparatus 30000 includes one or more input/output ports 31000, a storage controller 32000, one or more flash memory packages 33000 in each of which flash memory modules 33100 are mounted, a cache memory 34000, and a management port 35000 through which the storage apparatus is connected to the management network 60000. These components are interconnected via the storage controller 32000.

A microprogram (not shown) that controls the components of the storage apparatus resides in the storage controller 32000. Based on the technology disclosed in the patent document 1, a storage area in the storage apparatus 40000 can be recognized as an external device (EXDEV) and provided as a logical device (LDEV) for the host computer 10000. Further installed in the storage controller 32000 are: a logical device table (LDEV TBL) 32100 to be used to manage logical devices; an internal device table (INDEV TBL) 32200 to be used to manage internal devices (INDEV) that are storage areas formed with the flash memory modules in the flash memory packages to be described later; an external device table (EXDEV TBL) 32300 to be used to manage external devices; a cache allocation table (CM TBL) 32400 to be used to manage cache-memory storage situations of data items retrieved into partial areas of logical devices; a flash memory package table (FPK TBL) 32500 to be used to manage flash memory packages; a device management program (DEV management PG) 32600 to be used to manage allocations of devices or states thereof; an input/output control program (I/O control PG) 32700 to be used to control pieces of input/output processing performed on logical devices; a usage-based substitute area capacity table (USAGE TBL) 32800 to be used to define substitute area capacities associated with usages of internal devices to be described later; and an internal device configuration program (INDEV PG) 32900 to be invoked when the device management program 32600 configures an internal device. These programs are loaded from a storage medium such as a hard disk, which is incorporated in the storage controller, into a memory and then executed by the CPU.

The flash memory package (FPK) 33000 is a substrate having one or more flash memory modules (FM) 33100 mounted thereon. What is referred to as the flash memory module (FM) 33100 is a printed circuit board on which multiple flash memory chips are mounted, and is shaped like, for example, a dual inline memory module (DIMM). The device management program 32600 to be described later creates an internal device by combining a flash memory package and a flash memory module so as to meet a storage capacity designated by a storage manager, and stores data while dispersing it according to the RAID technology.

For convenience's sake, the number of input/output ports 31000 is two of input/output ports P11 and P12. The input/output port P11 is used to connect the storage apparatus to the host computer, and the input/output port P12 is used to connect the storage apparatus to the storage apparatus ST2. Moreover, the number of flash memory packages 33000 is four, and each of the flash memory packages 33000 has n flash memory modules (where n denotes an integer equal to or larger than 2) of a storage capacity of 256 G bytes mounted therein.

FIG. 3 shows an example of the logical device table 32100 installed in the storage apparatus ST1.

FIG. 3 shows the table which the storage apparatus ST1 uses to manage logical devices. The logical device table 32100 includes: a field 32110 in which a logical device ID that is an identifier unique to a logical device in the storage apparatus ST1 is registered; a field 32120 in which a host recognizable capacity of a logical device to be provided for the host computer is registered; a device ID field 32130 in which whether a storage area corresponding to a logical device is formed with an internal device or an external device is specified; a state field 32140 in which whether a logical device has been allocated to the host computer is specified; and a field 32150 in which when a logical device has been allocated to the host computer, a host connection destination input/output port number, an SCSI target ID, or an SCSI logical unit number is registered.

In the state field 32140, when a logical device has already been allocated to the host computer, Allocated is registered. When the logical device has not been allocated to the host computer, Unallocated is registered. When the logical device has not been allocated to the host computer, Not Applicable (N/A) is registered in the port number/target ID/logical unit number field 32150.

FIG. 4 shows an example of the internal device table 32200 installed in the storage apparatus ST1.

FIG. 4 shows the table which the storage apparatus ST1 uses to manage internal devices. The internal device table 32200 includes a field 32210 in which an internal device ID that is an identifier unique to an internal device in the storage apparatus ST1 is registered, a field 32220 in which a basic capacity of an internal device to be described later is registered, a field 32230 in which a substitute area capacity of a substitute area to be preserved by an internal device is registered, a field 32240 in which when an internal device has already been allocated as a logical device, the logical device ID is registered, a field 32250 in which a RAID configuration adopted for an internal device is specified, a field 32260 in which a stripe size of data to be stored in an internal device is specified, a field 32270 in which a flash memory package realizing an internal device is registered, a field 32280 in which a flash memory module in a flash memory package realizing an internal device is registered, and a field 32290 in which an address space association list relevant to an internal device to be described later is registered.

Now, a basic capacity and a substitute area capacity will be described below. Updating each bit in a flash memory is limited to one direction from 1 to 0 (or from 0 to 1). If reverse updating is required, a block in a flash memory chip (which will be called a memory block) is deleted in order to set the entire memory block into 1s (or 0s). Moreover, restrictions are imposed on the number of times of deletion (an upper limit of the number of times of deletion). For example, in the case of a NAND flash memory, the upper limit of the number of times of deletion ranges from ten thousand times to one hundred thousand times. Consequently, when a flash memory is connected to a computer as a substitute for a hard disk, the number of times of deletion performed on part of memory blocks may reach the upper limit because of a variance in a writing frequency among the memory blocks, and the flash memory may not be able to be used. For example, in a typical file system, since a memory block allocated to a directory and an inode is higher in a rewriting frequency than the other memory blocks, the possibility that the number of times of deletion performed on the memory block may reach the upper limit is high. Consequently, a memory block (substitute memory block) that substitutes for the memory block which cannot be used any longer (defective memory block) is allocated in order to extend the service life of an internal device. The basic capacity refers to a storage capacity required for providing a host recognizable capacity. Incidentally, the basic capacity includes a parity data storage capacity dependent on a RAID configuration that will be described later. Therefore, the basic capacity may not square with the host recognizable capacity. For example, in the case of the internal device IN01 shown in FIG. 4, the basic capacity is 768 G bytes. However, since the RAID5 (3D+1P) configuration to be described later is adopted, the host recognizable capacity comes to 576 G bytes that is 75% of 768 G bytes and is equal to the host recognizable capacity of the logical device L01. The substitute area capacity refers to the storage capacity of a storage area to be preserved as a substitute memory block. Assuming that the same RAID configuration as that based on which the basic capacity is defined is adopted, the substitute area capacity is defined as a storage capacity including the parity data storage capacity.

Moreover, in the stripe size field 32260, a memory block length may be defined. For convenience' sake, the memory block length of the flash memory modules in all flash memory packages shall be 256K bytes.

In the associated flash memory package field 32270, FPKn-m (where n and m denote integers that are equal to or larger than 1 and satisfy n≦m) signifies that flash memory packages FPKn to FPKm are employed. In the present invention, the storage apparatus ST1 has four flash memory packages FPK1 to FPK4 incorporated therein. In the case of the internal device IN01 in FIG. 4, since FPK1-4 is specified, all the four flash memory packages FPK1 to FPK4 are employed. Moreover, in the associated flash memory module number field 32280, an integer k equal to or larger than 1 is registered. The integer indicates that the k-th flash memory module in the flash memory package specified in the associated flash memory package field is employed. These two fields informs that, for example, in the case of the internal device IN01 in FIG. 4, the flash memory module FM1-1 of the flash memory package FPK1, the flash memory module FM2-1 of the flash memory package FPK2, the flash memory module FM3-1 of the flash memory package FPK3, and the flash memory module FM4-1 of the flash memory package FPK4 are employed. In the RAID configuration field 32250, a RAID configuration the storage apparatus ST1 can support is registered. For example, RAID5 (3D+1P) signifies that data is stored while being striped into three flash memory packages out of the four flash memory packages (3D is specified), and one flash memory package is used to store parity data (+1P is specified).

The address space association list field 32290 indicates a relationship of association between an address of data in an internal device having the host recognizable capacity and a memory block in a flash memory module in which the data is stored. Specifically, in the case of the internal device IN01 shown in FIG. 4, the first element in the list field "0 to 768 kB, FM1-#1" signifies that data items at addresses 0 to 768 KB are stored in the first memory blocks of the first flash memory modules of the respective flash memory packages (that is, flash memory modules FM1-1, FM2-1, FM3-1, and FM4-1). The second element in the list field "768 KB to 1536 KB, FM1-#850" signifies that data items at addresses 768 KB to 1536 KB in the internal device are stored in the 850 th memory blocks of the first flash memory modules of the respective flash memory packages.

FIG. 5 shows an example of the external device table 32300 installed in the storage apparatus ST1.

FIG. 5 shows the table which the storage apparatus ST1 uses to manage external devices. The external device table 32300 includes a field 32310 in which an external device ID that is an identifier unique to an external device in the storage apparatus ST1 is registered, a field 32320 in which a host recognizable capacity of an external device to be provided for the host computer is registered, a field 32330 in which a logical device ID formed with an external device is specified, a field 32340 in which an input/output port through which the storage apparatus ST1 accesses an external device is specified, a field 32350 in which a device ID is specified as identification information of an external device, a field 32360 in which a logical device ID is specified, and a field 32370 in which a connection destination I/O port number of the storage apparatus ST1, an SCSI target ID, or an SCSI logical unit number is registered.

Numerical values specified in the fields 32350, 32360, and 32370 relating to storage identification information can be acquired by issuing an SCSI inquiry command from the storage apparatus ST1 to an external device concerned.

FIG. 6 shows an example of the cache memory table 32400 installed in the storage apparatus ST1.

FIG. 6 shows the table which the storage apparatus ST1 uses to manage cache memory allocated states. The total capacity 32460 of the cache memory is utilized while being segmented in units of a block. The block length is registered in a field 32450. The block length 32450 may be a fixed value to which the storage apparatus is set based on, for example, a memory block length adopted for flash memories incorporated in the storage apparatus or on a RAID configuration, or may be able to be defined by a storage manager. In the present invention, the cache memory capacity is 512 G bytes, and the storage apparatus ST1 uses four flash memory modules, for which a memory block length of 256K bytes is adopted, to implement a RAID configuration. The cache block length is therefore set to 1024K bytes. Consequently, the number of cache blocks is 512, and records on the respective blocks exist. Each record is structured to have a block ID field 32410 to be used to uniquely identify a cache block, a field 32420 in which a cache state is specified, a field 32430 in which a logical device as which the cache memory is allocated is specified, and a field 32440 in which addresses as which the cache memory is allocated is specified.

The state field 32420 specifies a Clean state in which data in the cache memory squares with data stored in an internal device or external device, a Dirty state in which data in the cache memory is updated but is not yet reflected on data in an internal device or external device, or a Not Used state in which the cache block is not yet allocated. In the Not Used state, Not Applicable (N/A) is registered in the associated logical device ID field 32430 and logical device address field 32440.

FIG. 7 shows an example of the flash memory package table 32500 installed in the storage apparatus ST1.

FIG. 7 shows the table which the storage apparatus ST1 uses to manage use states of flash memory packages. The flash memory package table 32500 includes a field 32510 in which an ID with which a flash memory package can be uniquely identified is registered, a field 32520 in which an ID with which a flash memory module in each flash memory package can be uniquely identified is registered, a field 32530 in which the capacity of each flash memory module is specified, a field 32540 in which the address of each flash memory module is specified, a field 32550 in which the use state of a flash memory block specified in the address field 32540 is specified, a field 32560 in which an internal device allocated as a flash memory block specified in the address field 32540 is specified, and a field 32570 in which the rewriting frequency by which an address is rewritten is specified.

The state field 32550 specifies Used which signifies that a flash memory block is used, or Not Used which signifies that the flash memory block is unused.

When Not Used is specified, Not Applicable (N/A) is registered in the allocated internal device ID field 32560 and rewriting frequency field 32570. The rewriting frequency field is used to provide an index indicating based on the ratio to the rewriting permissible frequency, which is defined for each flash memory module, how many flash memory blocks may become defective.

The configuration of the computer system in the embodiment 1 is employed has been described so far.

(1-2) Processing Relevant to a Logical Device in the Storage Apparatus ST1 of the Embodiment 1

Next, processing to be performed by the storage apparatus ST1 of the present embodiment will be described below. The processing is implemented by the device management program 32600, input/output control program 32700, and internal device program 32900 installed in the storage apparatus ST1 30000.

The device management program 32600 is a program that implements the processing of recognizing an external device and registering it as a logical device, and the processing of creating an internal device and registering it as a logical device. The input/output control program 32700 is a program that controls input/output processing which a host computer performs on a logical device. The internal device program 32900 is a program that creates an internal device and registers it as a logical device.

Flowcharts describing the programs will be presented below. Unless otherwise noted, the steps in each program shall be executed by the storage controller 32000 of the storage apparatus ST1.

Figure 8:
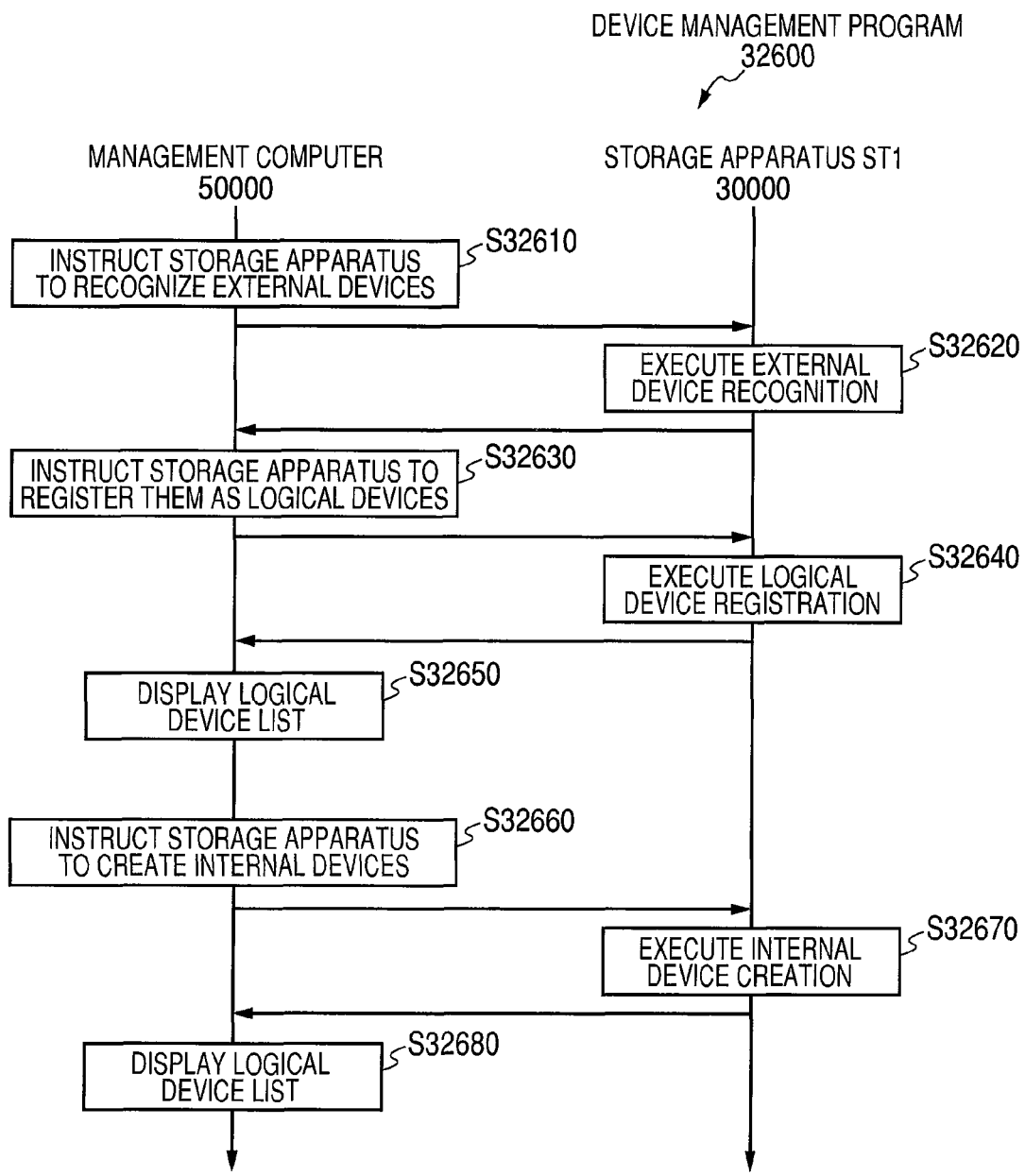
FIG. 8 is a flowchart describing the contents of processing to be performed by a device management program that is run by the storage apparatus ST1 of the embodiment 1 or 2 in accordance with the present invention.

FIG. 8 is the flowchart describing the device management program 32600.

To begin with, the management computer instructs the storage apparatus ST1 to recognize external devices (step S32610). Specifically, logical devices are created using the storage apparatus ST2, and connections are established so that the logical devices can be recognized through the input/output port of the storage apparatus ST1. Through which of the input/output ports the external devices should be recognized is transmitted to the storage apparatus ST1.

The storage apparatus ST1 having been designated the input/output port at step S32610 executes external device recognition (step S32620). Specifically, an SCSI inquiry command is issued through the designated input/output port. The external device table 32300 is produced based on the results of the issuance, and transmitted to the management computer.

Thereafter, the management computer designates external devices, which will be registered as logical devices, from among recognized external devices (step S32630). Specifically, external devices to be provided as logical devices for a host computer are designated from among external devices created at step S32620, and the list of the external devices is transmitted to the storage apparatus ST1. At this time, allocation of the logical devices to the host computer may be designated.

The storage apparatus ST1 having been designated external devices to be registered as logical devices at step S32630 executes logical device registration (step S32640). Specifically, the logical device table 32100 is produced by creating the entries of the designated external devices. If allocation of the logical devices to the host computer is designated, the state field 32140 and the port number/target ID/logical unit number field 32150 may be filled out. The storage apparatus ST1 transmits the result of logical device registration and the result of allocation to the host computer to the management computer.

The management computer displays the received logical device list (step S32650). The contents of display will be described later.

The processing relating to recognition of external devices and registration as logical devices has been described so far.

Next, the processing relating to creation of internal devices and registration as logical devices will be described below.

To begin with, the management computer instructs the storage apparatus ST1 to create internal devices (step S32660). Specifically, logical device creation is instructed by designating a host recognizable capacity, a substitute area capacity, and a RAID configuration. The details will be given in conjunction with the contents of display.

The storage apparatus ST1 having designated a host recognizable capacity, a substitute area capacity, and a RAID configuration at step S32660 executes internal device creation (step S32670). Specifically, the internal device program 32900 to be described later is invoked.

The management computer displays a received list of logical devices (step S32650). The contents of display will be described later.

The device management program 32600 has been described in conjunction with the flowchart.

Next, the internal device configuration program 32900 shown in FIG. 13 will be described below. For the description, an internal device creation screen image 70000 shown in FIG. 9 and the usage-based substitute area capacity table 32800 shown in FIG. 12 are employed.

Figure 13:
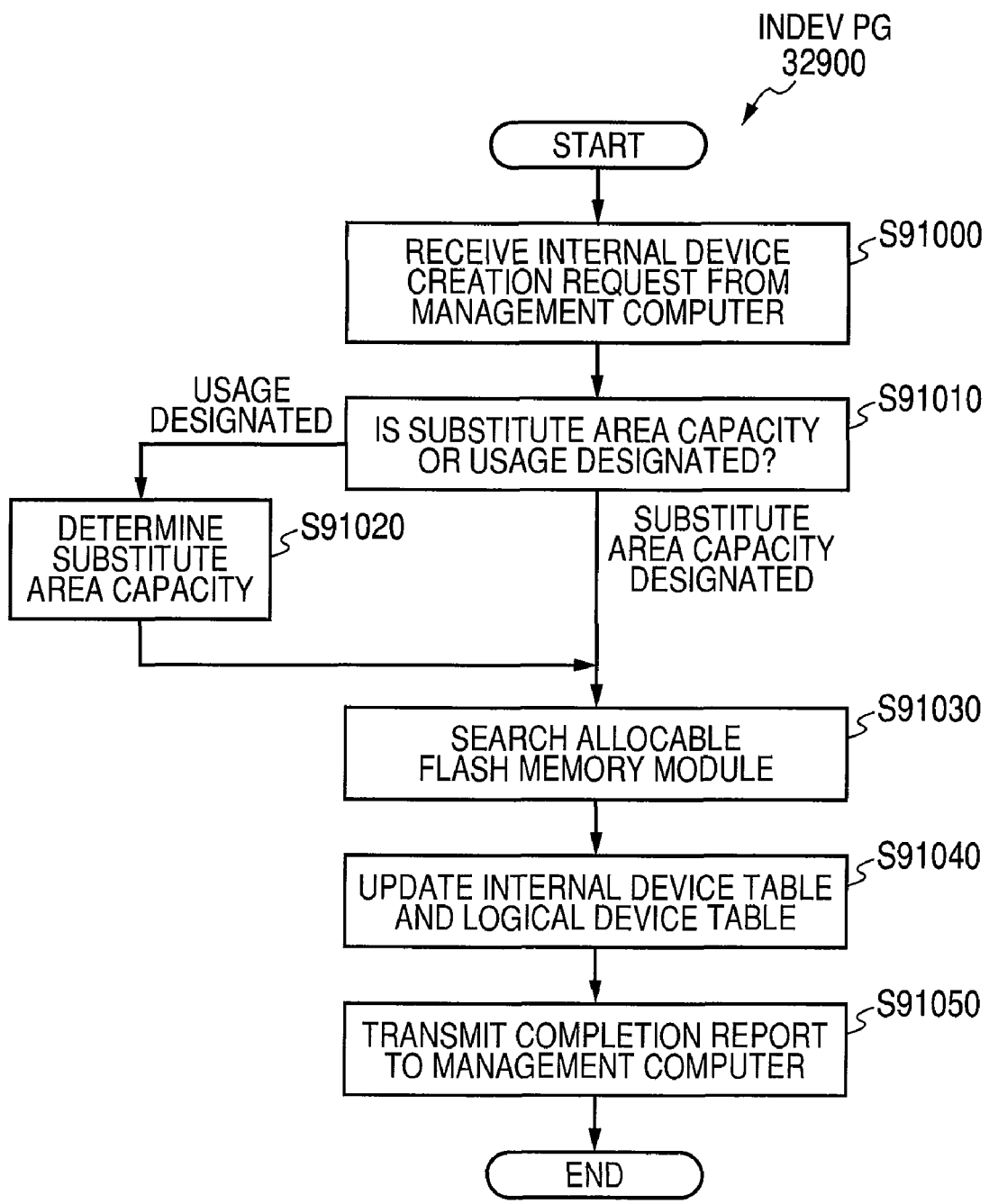
FIG. 13 is a flowchart describing the contents of processing to be performed by an internal device configuration program that is run by the storage apparatus ST1 of the embodiment 1 in accordance with the present invention.

When the internal device program 32900 shown in FIG. 13 is executed at step S32670 in the device management program 32600, the storage apparatus ST1 receives an internal device creation request from the management computer (step S91000).

The step S91000 in FIG. 13 will be described below. For this purpose, an internal device creation screen image in FIG. 9 to be displayed by the management computer while the storage apparatus ST1 is running the device management program will be described below. The internal device creation screen image is a screen image through which parameters necessary for determining internal devices are received from the storage manager. The internal device creation screen image 70000 includes a field 70010 in which a host recognizable capacity is designated, a field 70020 in which a substitute area capacity is designated, a field 70030 in which a RAID configuration is designated, and a button 70050 to be depressed in order to transmit an internal device creation command. Incidentally, the host recognizable capacity may not be designated but a basic capacity may be directly designated.

Figure 9:
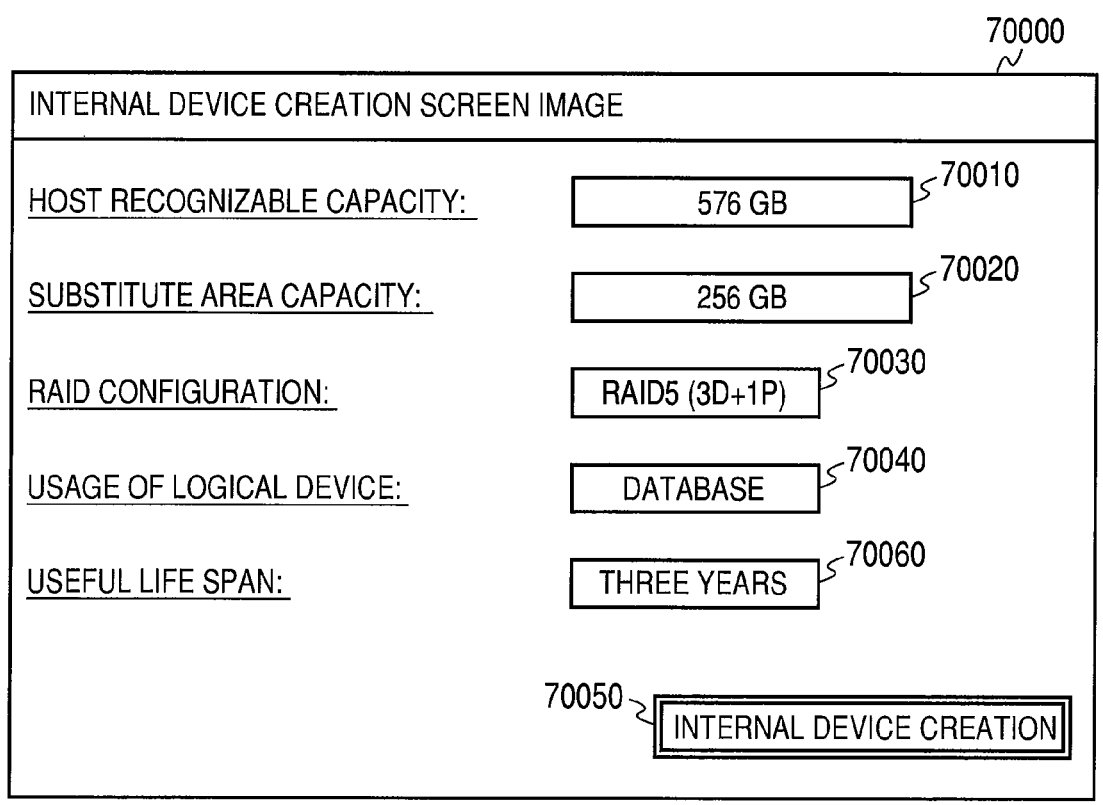
FIG. 9 shows an example of an internal device creation screen image to be displayed by a management computer while the device management program is being run by the storage apparatus ST1 of the embodiment 1 in accordance with the present invention.

Referring back to step S91000 in FIG. 13, when the parameters shown in FIG. 9 are designated, the storage apparatus ST1 calculates the basic capacity on the basis of the designated host recognizable capacity and RAID configuration.

For example, when the host recognizable capacity is 576 G bytes and the RAID configuration is RAID5 (3D+1P), the basic capacity should be a four-thirds of the host recognizable capacity and is therefore 768 G bytes.

The step S91000 has been described so far.

Thereafter, in order to determine the substitute area capacity, the storage apparatus ST1 decides whether the substitute area capacity has been designated in the internal device creation screen image shown in FIG. 9 and whether usage has been designated therein (step S91010). When the substitute area capacity has been designated, the designated capacity is used as it is, and the storage apparatus jumps to step S91030. When usage has been designated, the storage apparatus jumps to step S91020.

If it is found at step S91010 that usage has been designated, the storage apparatus ST1 determines the substitute area capacity on the basis of the usage (step S91020).

In order to describe the step S91030 in FIG. 13, a description will be made of the usage-based substitute capacity table 32800 shown in FIG. 12. The usage-based substitute capacity table is a table in which the storage manager pre-defines the usage 32320 indicating an application or the like that uses an internal device, and the substitute area capacity 32330 per year required for the usage.

Referring to the step S91030 in FIG. 13, the usage-based substitute capacity table is referenced to acquire the value entered in a logical device usage field 70040 in the internal device creation screen image shown in FIG. 9, and a value that is entered in a useful life span field 70060 and signifies how many years an internal device to be created is supposed to be useful. The substitute area capacity is calculated by working out the product of the value of the substitute area capacity 32330 per year shown in FIG. 12 by the value in the useful life span field 70060 in relation to the usage indicated with the value in the logical device usage field 70040. For example, when the usage for a logical device is a database and the useful life span is three years, the substitute area capacity per year for the usage "database" is 50 G bytes. The substitute area capacity therefore comes to 150 G bytes.

The step S91020 has been described so far.

When the substitute area capacity is determined at step S91010 or step S91020, the storage apparatus ST1 calculates the sum of the basic capacity and the substitute area capacity and searches an allocable flash memory module (step S91030). For example, when the basic capacity is 768 G bytes and the substitute area capacity is 256 G bytes, the sum comes to 1024 G bytes. For determining a memory block in the flash memory module that offers the same capacity as the sum of 1024 G bytes, the capacities of areas for which Not Used is specified in the state field 32550 are cumulated by referencing the flash memory package table 32500 orderly from the leading flash memory module in each of flash memory packages. In the example shown in FIG. 7, Used is specified for the entire area in the first flash memory module of each flash memory package and for the leading 128 G bytes of the second flash memory module. Consequently, in order to preserve an area of 1024 G bytes long, the remaining 128 G bytes of the second flash memory module and the leading 128 G bytes of the third flash memory module should be utilized. Herein, an area is preserved by utilizing flash memory modules starting with the leading flash memory module. A method of preserving an area may be any other method.

Once an allocable flash memory module can be searched, the storage apparatus ST1 updates the internal device table and logical device table (step S91040). Specifically, Used is specified in the flash memory package table 32500 as the state of a memory block preserved at step S91030, and a new ID is assigned as an assigned internal device ID. Based on the newly produced internal device ID, a new entry is created in the internal device table 32200. In the new entry of the internal device table 32200, the basic capacity determined at step S91010, the substitute area capacity determined at step S91010 or step S91020, the RAID configuration determined at step S91010, and an associated flash memory package and an associated flash memory module number which are determined at this step are registered. A specific value may be registered as a stripe size. A new entry is created in the logical device table 32100, and data items on a logical device are registered. A logical device ID registered in the new entry of the logical device table 32100 is registered in the previously crated entry of the internal device table.

The step S91030 has been described so far.

Finally, the storage apparatus ST1 transmits the list of logical devices, in association with which newly created internal devices are registered, to the management computer, and reports completion (step S91050).

The internal device configuration program 32900 shown in FIG. 13 has been described so far.

FIG. 10 shows an example of a logical device list display screen image to be displayed by the management computer while the storage apparatus ST1 is running the device management program.

The logical device list display screen image 80000 includes a field 80010 in which a logical device ID is displayed, a field 80020 in which a host recognizable capacity of a logical device to be provided for a host computer is displayed, an associated device ID field 80030 which indicates whether a storage area corresponding to a logical device is formed with an internal device or an external device, a state field 80040 which indicates whether a logical device has already been allocated to a host computer, and a field 80050 in which when the logical device has already been allocated to the host computer, a host connection destination I/O port number, an SCSI target ID, or an SCSI logical unit number is registered. In these fields, the values specified in the logical device table 32100 are displayed.

When a logical device is formed with an internal device, fields described below may be displayed. Namely, the fields include a field 80060 in which the basic capacity of the internal device is indicated, a field 80070 in which the substitute area capacity for the internal device is indicated, and a field 80080 in which the RAID configuration adopted for the internal device is indicated. In these fields, the values specified in the internal device table 32200 are displayed. When the logical device is formed with an external device, Not Applicable (N/A) is displayed in the fields.

Moreover, a field 80090 in which when a logical device is formed with an internal device, if a rewriting frequency predefined for flash memory packages or flash memory modules constituting the internal device is exceeded, a warning signifying that there is a possibility that the number of defective blocks may be too large is indicated may be added. The rewriting frequency field 32570 in the flash memory package table 32500 is cyclically monitored, and the warning is given to an internal device to be formed using a flash memory module whose rewriting frequency has exceeded a predetermined frequency. The warning may not only be displayed in a screen image but also be notified by mail or according to a simple network management protocol (SNMP) or accumulated as a log such as a system log.

Figure 11A:
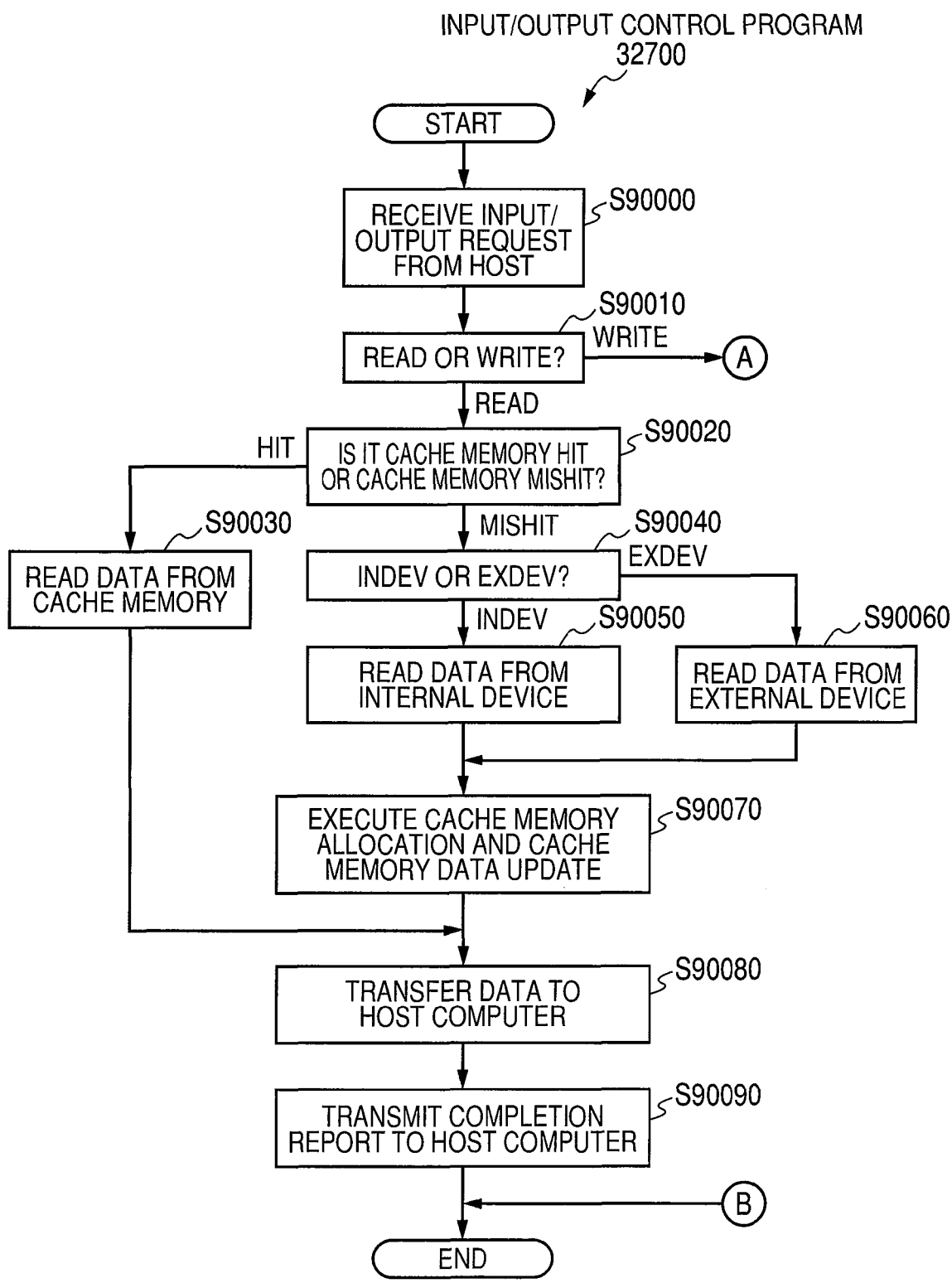

FIG. 11 is a flowchart describing the contents of processing to be performed by the input/output control program that is run by the storage apparatus ST1.

To begin with, the storage apparatus ST1 receives an input/output request from a host computer (step S90000). Specifically, the storage apparatus receives a Read or Write command that instructs reading or writing from or in a certain logical device according to the SCSI standard.

The storage apparatus ST1 having received the input/output request decides whether the request is a request for reading or writing data (step S90010). For reading, the storage apparatus jumps to step S90020. For writing, the storage apparatus jumps to step S90100.

If the request is found to be a request for reading at step S90010, the storage apparatus ST1 interprets a reading destination address, and decides whether data at the address is a cache hit (step S90020). Specifically, if any of all entries of the cache memory table has the values in the associated logical device ID field 32430 and logical device address field 32440 squared with each other, a cache hit is decided. If none of the entries of the cache table has the values therein squared with each other, a cache mishit is decided. In the case of the cache hit, the storage apparatus jumps to step S90030. In the case of the cache mishit, the storage apparatus jumps to step S90040.

If a cache hit is decided at step S90020, the cache data is read (step S90030), and transferred to the host computer (step S90080). The storage apparatus then reports the host computer the fact that the data input/output request has been handled (step S90090), and terminates the input/output control program.

If a cache mishit is decided at step S90020, the storage apparatus decides whether a logical device that is a data access destination is formed with an internal device or an external device (step S90040). Specifically, the associated device ID field 32130 of the logical device table 32100 is checked. If the logical device is formed with an internal device, the storage apparatus jumps to step S90050. If the logical device is formed with an external device, the storage apparatus jumps to step S90060.

If the logical device is decided to be formed with an internal device at step 90040, data is read from the internal device (step S90050). Specifically, the associated flash memory package field 32270, associated flash memory module number field 32280, and address space association list field 32290 of the internal device table 32200 are checked to see from what memory block of what flash memory module data should be read. For example, when data of 512K bytes long is read from the internal device IN01 whose leading address is address 0, data of 512K bytes long is read from memory blocks, which start with a memory block 1, of the first flash memory module (that is, the flash memory module FM1-1, FM2-1, FM3-1, or FM4-1) of each of the flash memory packages FPK1 to FPK4. After data is read, the storage apparatus proceeds to step S90070.

If the logical device is decided to be formed with an external device at step 90040, data is read from the external device (step S90060). Specifically, the initiator port ID field 32340 of the external device table 32300 is checked, and an SCSI Read command is issued to a logical device designated in storage identification information. After data is read, the storage apparatus proceeds to step S90070.

After data is read at step S90050 or S90060, the cache memory is allocated to the read data and cache memory data is updated (step S90070). Specifically, the cache memory table 32400 is referenced to check if Not Used is registered for any block. If such a block is found, the block is allocated and the data is updated. At this time, if multiple blocks are needed because the block size of a flash memory or a hard disk is different from the block size of the cache memory, multiple blocks are allocated. Moreover, if a block registered as Not Used cannot be preserved in the cache memory, a block in a clean state may be used instead and allocated according to an arbitrary method. After cache memory allocation and data update are completed, the data is transferred to the host computer (step S90080). The host computer is reported the fact that the data input/output request has been handled (step S90090). The input/output control program is then terminated.

If the request is found to be a request for writing at step S90010, the storage apparatus ST1 interprets a writing destination address, and decides if data at the address is a cache hit (step S90100). Since the concrete processing is identical to that of step S90020, an iterative description will be omitted. If the data is a cache hit, the storage apparatus jumps to step S90110. If the data is acache mishit, the storage apparatus jumps to step S90160.

If the data is found to be a cache hit at step S90100, the storage apparatus ST1 updates the cache memory with writing data (step S90110). Specifically, after data of a cache memory block is updated, the state of the block is changed by specifying Dirty in the cache memory table 32400. After step S90110 is completed, the host computer is reported the fact that the data input/output request has been handled (step S90120). In order to write data in an internal device or an external device so as to cancel the dirty state of the cache memory block, whether a logical device that is a data access destination is formed with an internal device or an external device is decided (step S90130). Specifically, the associated device ID field 32130 of the logical device table 32100 is checked to make a decision. In case of an internal device, the storage apparatus jumps to step S90140. In case of an external device, the storage apparatus jumps to step S90150.

If the data is found to be a cache mishit at step S90100, the storage apparatus ST1 allocates a cache memory block to writing data (step S90170). Since the concrete processing is identical to cache allocation of step S90070, an iterative description will be omitted. After step S90170 is completed, the host computer is reported the fact that a data input/output request has been handled (step S90180). In order to store data in a preserved cache memory block, Read Modify Write is executed in order to read data from an access destination in an internal device or an external device into the cache memory block so as to then modify the data with writing data sent from the host computer. For this purpose, whether a logical device that is the data access destination is formed with an internal device or an external device is decided (step S90180). Specifically, the associated device ID field 32130 of the logical device table 32100 is checked to make a decision.

If a decision is made at step 90180 that the logical device is formed with an internal device, data is read from the internal device (step S90190). Since the concrete processing is identical to that of step S90050, an iterative description will be omitted. Further, data read at step S90190 is used to update the data in the cache memory block (step S90200). The storage apparatus then jumps to step S90140.

If a decision is made at step 90180 that the logical device is formed with an external device, data is read from the external device (step S90210). Since the concrete processing is identical to that of step S90060, an iterative description will be omitted. The data read at step S90210 is used to update the data of the cache memory block (step S90220). The storage apparatus then jumps to step S90150.

At step S90140, the storage apparatus ST1 writes data in the internal device so as to reflect the writing data, which has undergone Read Modify Write and has been stored in the cache memory block, on the internal device. Specifically, the associated flash memory package field 32270, associated flash memory module number field 32280, and address space association list field 32290 of the internal device table 32200 are checked to see in what memory block of what flash memory module data should be written. For example, in order to write data of 512K bytes long from the internal device IN01 with an internal device address 0 regarded as a leading address, data of 512K bytes long is written in memory blocks, which start with a memory block 1, of the first flash memory module (that is, the flash memory module FM1-1, FM2-1, FM3-1, or FM4-1) of each of the flash memory packages FPK1 to FPK4. As for another method, data may be written in a flash memory block preserved based on a substitute area capacity, and the relationship of association in the address space association list field may be rewritten. In this case, the use order of flash memory blocks specified in the address space association list field is not guaranteed but the rewriting frequencies of the flash memory blocks can be smoothed out. The memory blocks can be prevented from being defective in an early stage, or in other words, the service life of the flash memory package or flash memory module can be extended. After the step S90140 is completed, the storage apparatus ST1 terminates the input/output control program.

At step S90150, the storage apparatus ST1 writes data in the external device so as to reflect writing data, which has undergone Read Modify Write and has been stored in the cache memory block, on the external device. Specifically, the initiator port ID field 32340 of the external device table 32300 is checked, and, for example, an SCSI Write command is issued to a logical device designated in storage identification information. After step S90150 is completed, the storage apparatus ST1 terminates the input/output control program.

The input/output control program 32700 has been described in conjunction with the flowchart.

Processing relating to a logical device in the storage apparatus ST1 of the embodiment 1 has been described so far.

According to the present embodiment, flash memories are incorporated in a storage apparatus while being mounted in flash memory packages, and any flash memory module can be directly accessed without use of an accessing means for a magnetic disk. Moreover, when input/output request handling that uses the conventional magnetic disk accessing means is implemented, an existing magnetic disk storage apparatus can be utilized as it is.

The embodiment 1 has been described so far.

Embodiment 2

In the present embodiment, when an internal device that is a storage area formed with a flash memory is defined, if the substitute area capacity of the internal device is calculated based on the writing access frequency for a storage area that is realized with a hard disk drive and has a relationship of a copy mate with the storage area, the definition of the internal device can be simplified.

In a description to be made of the embodiment 2, unless otherwise noted, the configuration of the embodiment 1 and the tables and programs installed therein are utilized. Differences from the embodiment 1 will be described below.

(2-1) Configuration of a Computer System in which the Embodiment 2 is Employed

The configuration of a computer system in which the embodiment 2 is employed will be described below.

Figure 14:
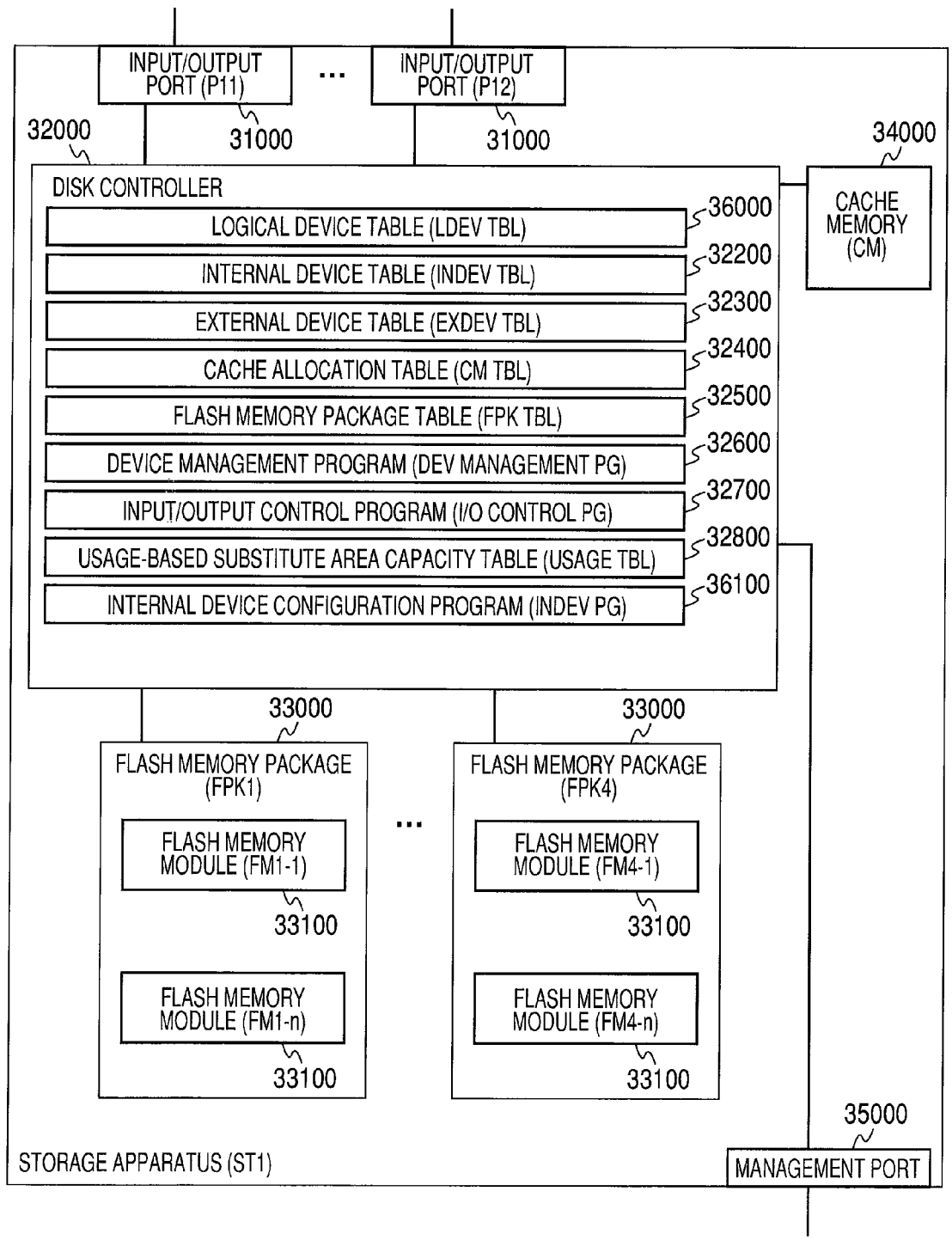
FIG. 14 shows an example of the detailed configuration of the storage apparatus ST1 of the embodiment 2 in accordance with the present invention.

FIG. 14 shows the configuration of the computer system in which the embodiment 2 is employed. Differences from the embodiment 1 lie in the larger number of entries of the logical device table 36000 and in the internal device configuration program 36100. Specifically, processing relating to a logical device in the storage apparatus ST1 of the embodiment 2 will be described later.

The configuration of the computer system in which the embodiment 2 is employed has been described above.

(2-2) Processing Relating to a Logical Device in the Storage Apparatus ST1 of the Embodiment 2

Processing to be performed by the storage apparatus ST1 of the present embodiment will be described below. The processing is implemented by the device management program 32600, input/output control program 32700, and internal device program 36100 installed in the storage apparatus ST1 30000. Since the device management program 32600 and input/output control program 32700 are identical to those of the embodiment 1, an iterative description will be omitted.

The logical device table 36000 and internal device program 36100 that are different from those of the embodiment 1 will be sequentially described below.

FIG. 15 shows an example of the logical device table 36000 installed in the storage apparatus ST1 of the embodiment 2.

A difference from the embodiment 1 lies in a point that the logical device table includes an entry 32160 in which the writing access frequency for each logical device is held. The writing access frequency refers to the number of times by which the storage controller 32000 of the storage apparatus ST1 has received a Write command instructing writing of data in a logical device (for example, an SCSI Write command) during a certain period of time. For example, the number of times of Write command reception per sec (input/output per second (IOPS)) may be held, or the number of Write commands received during a monitoring time of 1 min may be converted into an IOPS value. Further, a mean value of previous several IOPS values may be held, or a maximum or minimum value thereof may be held. Further, a history of previous IOPS values may be held, and a storage manager may be allowed to select any of IOPS value at the time of calculating a substitute area capacity.

Next, the internal device configuration program 326100 mentioned in FIG. 17 will be described below. For the description, an internal device creation screen image 71000 shown in FIG. 16 and the usage-based substitute capacity table 32800 shown in FIG. 12 are employed.

Step S91000 is identical to that in the embodiment 1.

A difference of step S91010 from that in the embodiment 1 lies in a point that if a substitute area capacity is not designated, the storage apparatus jumps to step S92000.

Figure 16:
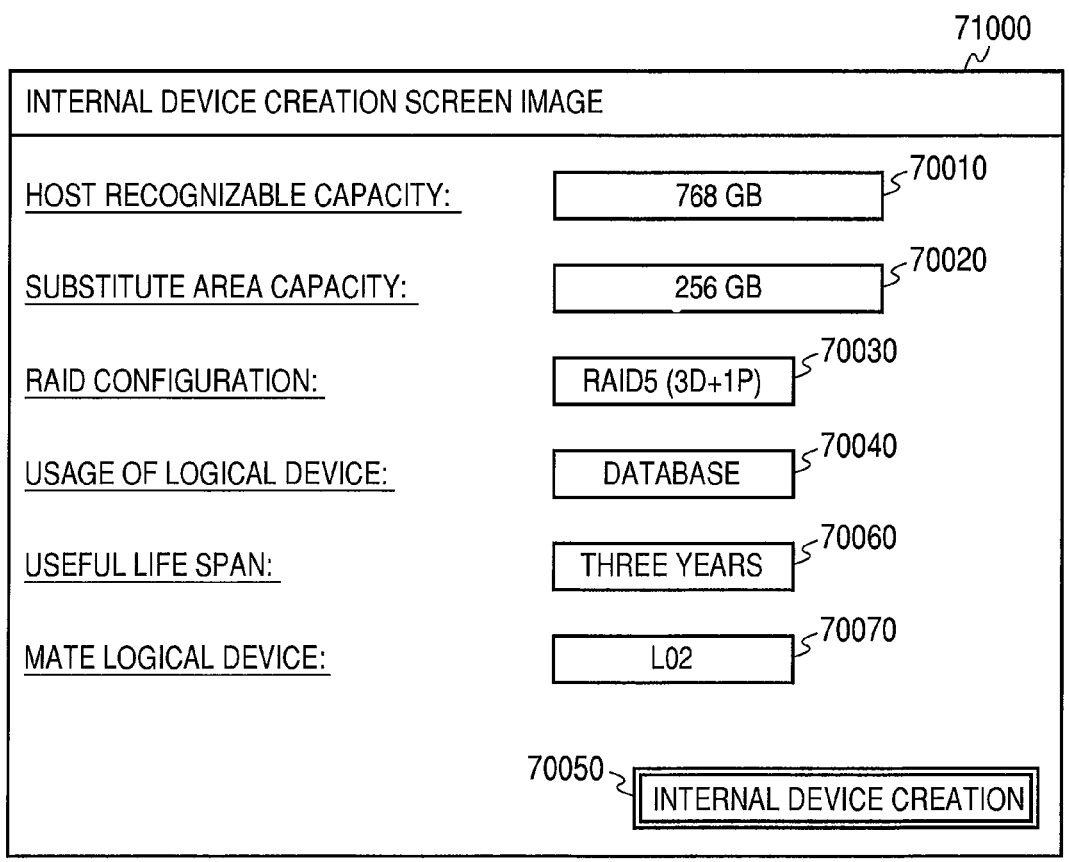
FIG. 16 shows an example of an internal device creation screen image to be displayed by the management computer while the device management program is being run by the storage apparatus ST1 of the embodiment 2 in accordance with the present invention.

At step S91010, if a substitute area capacity is not designated, a mate logical device field 70070 and a useful life span field 70060 of the internal device creation screen image 71000 shown in FIG. 16 are checked to see if a useful life span has been designated (step S92000). If a useful life span has been designated, the storage apparatus jumps to step S92010. If no useful life span has been designated, the storage apparatus jumps to step 92020 (step S92000).

Now, a mate logical device will be described below. What is referred to as the mate logical device is a logical device that is mated with the other logical device in order to implement data migration or data copy between storage areas provided by a storage system composed of the storage apparatuses ST1 and ST2 on the assumption of two cases described below. The first case is a case where since the access frequency for data stored in a logical device formed with a current external device has increased, migration is made to a logical device formed with an internal device to which fast access can be gained in order to thus improve the logical device performance. The second case is a case where data stored in a logical device formed with an external device or an internal device is copied into another logical device formed with an internal device in the storage apparatus ST1 in order to thus improve the logical device availability. Thus, when information on a logical device that is a mate is acquired, a substitute area capacity can be calculated in consideration of the writing access frequency for a logical device, which is a migration source or a copy source, at the time of calculating the substitute area capacity at step S92010 to be described later.

Referring back to FIG. 17, at step S92010, the storage apparatus ST1 calculates a substitute area capacity on the basis of the writing access frequency for a designated mate logical device and the useful life span thereof (step S92010). Specifically, expressions like those shown in FIG. 18 are employed.

The contents of the calculation indicated by the expressions in FIG. 18 will be described below.

To begin with, the writing access frequency for a mate logical device is divided by the number of comprehensive rewritings in order to work out a flash memory block rewriting frequency (W) for a newly created internal device. This is a value signifying how many times per sec a flash memory block can be rewritten on the assumption that: the writing access frequency is equivalent to the writing access frequency for the mate logical device; and comprehensive rewriting is performed so that the flash memory will be updated by updating the cache memory as long as the number of writings is retained at a certain number of writings.

Thereafter, a product of the flash memory block rewriting frequency W by a rewritten block length by a useful life span is calculated. The product (W1) of these three values expresses a total written capacity of the newly created logical device by which the logical device is written during the useful life span. As a rewriting frequency to be attained during the useful life span, the product of the flash memory block rewriting frequency W by the useful life span is utilized. As already described, the flash memory is deleted or overwritten in units of a flash memory block. Therefore, the product of the rewriting frequency attained during the useful life span by the rewritten block length is calculated in order to work out the W1 value.

Finally, the W1 value is divided by the upper limit of the number of times of rewriting in order to work out the substitute area capacity. This is intended to reduce the W1 value by reusing the same flash memory block. The result is multiplied by a conversion rate ($10^{-6}$) in order to convert a unit of kilobytes into a unit of gigabytes.

For example, assuming that the mate logical device is, as shown in FIG. 16, the logical device L02 and the useful life span is three years, the substitute area capacity is calculated as mentioned below according to the expressions shown in FIG. 18. Incidentally, the number of comprehensive rewritings shall be ten (that is, the results of ten writings are comprehensively reflected on a flash memory block). The rewritten block length shall be 256K bytes and the upper limit of the number of times of rewriting shall be one hundred thousand times. Since the writing access frequency for the logical device L02 is found to be 100 IOPS by referencing the logical device table 36000, the flash memory block rewriting frequency W comes to ten. Consequently, the total written capacity W1 comes to 242716 G bytes through calculation of 10×256×(3×3600×24×365) (the result is multiplied by the conversion rate ($10^{-6}$) beforehand in order to convert kilobytes into gigabytes). The division of the total written capacity W1 by the upper limit of the number of times of rewriting comes to approximately 24.3 G bytes.

The expressions in FIG. 18 have been described so far.

Referring back to FIG. 17, the substitute area capacity can be calculated at step S92010 according to the foregoing expressions.

If it is found at step S92000 that the mate logical device and useful life span are not designated, a predetermined writing access frequency and useful life span are used to calculate the substitute area capacity according to the expressions described in conjunction with FIG. 18 (step S92020). Herein, the predetermined writing access frequency may be a value designated by the storage manager or may be the value of the writing access frequency for an arbitrary logical device, which is created by designating the same usage, among the logical devices registered in the logical device table.

The steps S91030, 91040, and 91050 are identical to those of the embodiment 1.

The internal device configuration program 32900 has been described in conjunction with FIG. 17.

Processing relating to a logical device in the storage apparatus ST1 of the embodiment 2 has been described so far.

According to the present embodiment, the definition of a substitute area capacity can be simplified, and a storage area realized with a flash memory can be utilized irrespective of presence or absence of information on the flash memory.

The embodiment 2 has been described so far.

Figure 19:
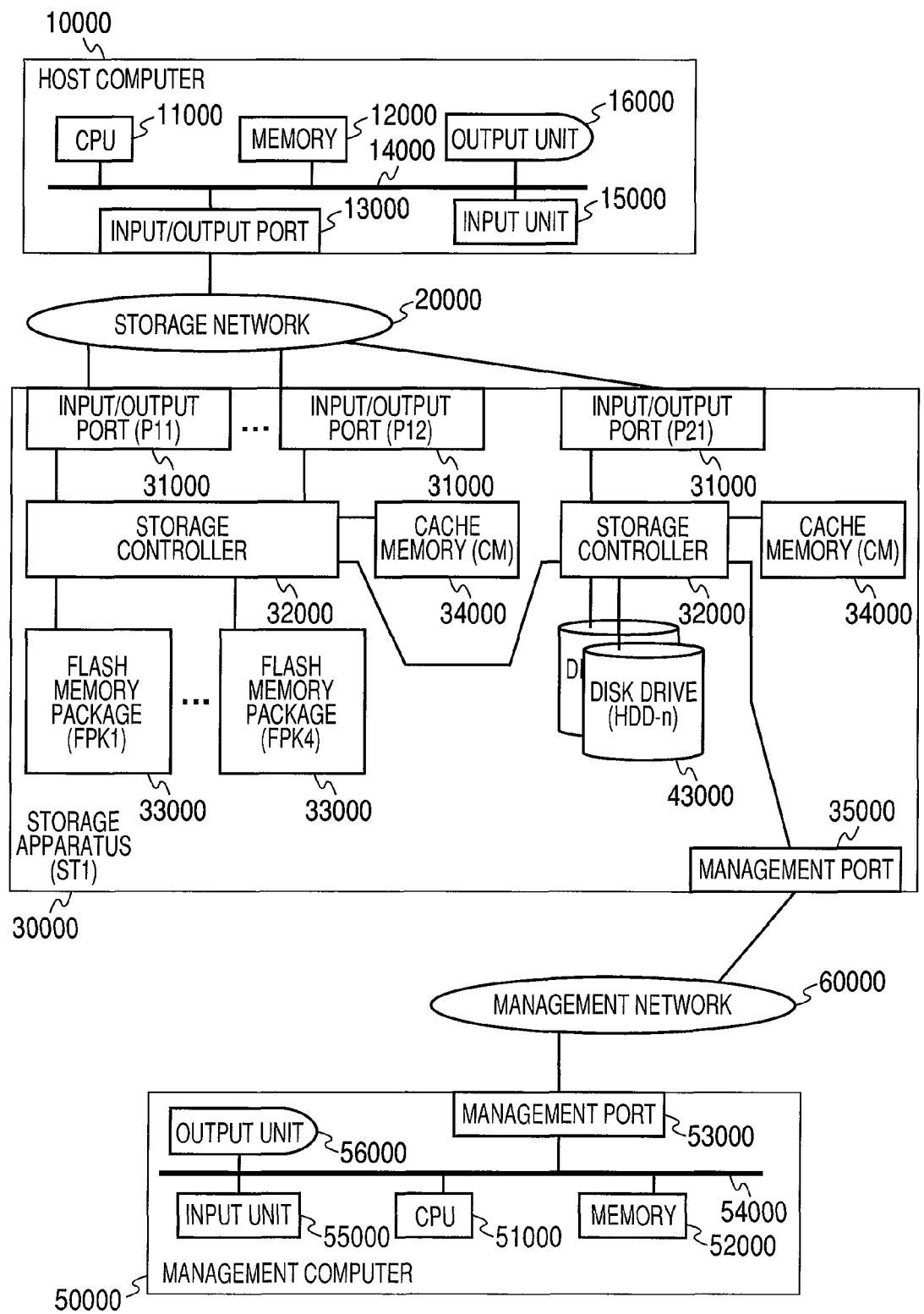
FIG. 19 shows an example of the configuration of a computer system including a variant of the embodiment 1 or 2 in accordance with the present invention.

As variants of the present embodiment and embodiment 1, the configuration of the computer system may, as shown in FIG. 19, include one storage apparatus ST1. At this time, the storage apparatus ST1 is different from those of the embodiments 1 and 2 in points that: the storage controller to which flash memory packages are connected manages internal devices; the storage controller to which disk drives are connected manages external devices; and the storage controllers are connected to each other. An internal device creating method and a logical device handling method are identical to those of the embodiments 1 and 2.

What is claimed is:

1. A storage area creation method for a storage apparatus, the method being implemented in a first storage apparatus included in a computer system, the computer system comprising the first storage apparatus, which includes one or more flash memory modules and a cache memory, a second storage apparatus, which is connected to the first storage apparatus and includes one or more hard disk drives, and a host computer connected to the first storage apparatus, wherein when the first storage apparatus receives a request for creation of a first storage area to be realized with a logical device formed with one or more flash memory modules, the first storage area having a relationship of a copy pair with a second storage area, the first storage apparatus creates the logical device, which is formed with one or more flash memory modules incorporated in the first storage apparatus, according to a capacity calculated by adding up the capacity of a storage area to be provided for the host computer and a substitute area capacity, and wherein the first storage apparatus defines the substitute area capacity according to a useful life span of the one or more flash memory modules forming the logical device and a writing access frequency for the second storage area.

2. The storage area creation method according to claim 1, wherein the second storage area is realized with a logical device formed with the one or more hard disk drives in the second storage apparatus.

3. The storage area creation method according to claim 1, wherein the useful life span is designated by the request.

4. The storage area creation method according to claim 1, wherein the first storage apparatus defines the substitute area capacity according to the useful life span, the writing access frequency, and an upper limit of the number of times of rewriting.

5. A first storage apparatus comprising:
one or more flash memory modules;
a cache memory; and
a storage controller,
wherein the first storage apparatus is connected to each of a host computer and a second storage apparatus, which includes one or more hard disk drives,
wherein the storage controller of the first storage apparatus receives a request for creation of a first storage area to be realized with a logical device formed with one or more flash memory modules, the first storage area having a relationship of a copy pair with a second storage area, calculates a logical device capacity by adding up the capacity of a storage area to be provided for the host computer and a substitute area capacity, creates the logical device, which is formed with one or more flash memory modules incorporated in the first storage apparatus, and defines the substitute area capacity according to a useful life span of the one or more flash memory modules forming the logical device and a writing access frequency for the second storage area.

6. The first storage apparatus according to claim 5, wherein the second storage area is realized with a logical device formed with the one or more hard disk drives in the second storage apparatus.

7. The first storage apparatus according to claim 5, wherein the useful life span is designated by the request.

8. The first storage apparatus according to claim 5, wherein the storage controller of the first storage apparatus defines the substitute area capacity according to the useful life span, the writing access frequency, and an upper limit of the number of times of rewriting.

* * * * *